(12) United States Patent
Stewart et al.

(10) Patent No.: US 10,070,499 B2
(45) Date of Patent: Sep. 4, 2018

(54) REVERSIBLE-POLARITY WIRING SYSTEM

(71) Applicant: Brilliant Home Technology, Inc., San Mateo, CA (US)

(72) Inventors: J. Marcus Stewart, San Mateo, CA (US); Aaron T. Emigh, San Mateo, CA (US); Steven Stanek, San Mateo, CA (US)

(73) Assignee: Brilliant Home Technology, Inc., San Mateo, CA (US)

( * ) Notice: Subject to any disclaimer, the term of this patent is extended or adjusted under 35 U.S.C. 154(b) by 0 days.

(21) Appl. No.: 15/861,637

(22) Filed: Jan. 3, 2018

(65) Prior Publication Data

US 2018/0192496 A1    Jul. 5, 2018

Related U.S. Application Data

(60) Provisional application No. 62/441,880, filed on Jan. 3, 2017.

(51) Int. Cl.
  *H05B 37/02* (2006.01)
  *F21V 23/04* (2006.01)
(52) U.S. Cl.
  CPC .............. *H05B 37/02* (2013.01); *F21V 23/04* (2013.01); *Y10T 307/944* (2015.04)
(58) Field of Classification Search
  CPC ............................ Y10T 307/944; H05B 37/02

USPC .............................. 315/137, 141, 291; 307/138
  See application file for complete search history.

(56) References Cited

U.S. PATENT DOCUMENTS

| 3,363,167 A * | 1/1968 | Szabo ................ H02J 7/1461 322/28 |
| 2012/0068626 A1 | 3/2012 | Lekatsas et al. |
| 2013/0320880 A1* | 12/2013 | Walker .................. H05B 37/02 315/294 |

FOREIGN PATENT DOCUMENTS

| EP | 2665182 A2 | 11/2013 |
| WO | WO-2004/057924 A1 | 7/2014 |

OTHER PUBLICATIONS

International Search Report and Written Opinion from PCT Application No. PCT/US18/12270, dated Mar. 29, 2018, 7 pages

* cited by examiner

*Primary Examiner* — Thuy Vinh Tran
(74) *Attorney, Agent, or Firm* — Mahamedi IP Law LLP

(57) ABSTRACT

A system to control an electrical device, such as a lighting component or set of components. The system includes a set of connection lines, a power control module and a load interface component. The power control module is responsive to an alternating current source being connected to one of a first connection line and a second connection line to provide a regulated voltage signal output. A load interface component receives the regulated voltage signal output to control the electrical device.

20 Claims, 5 Drawing Sheets

REVERSIBLE-POLARITY WIRING SYSTEM

RELATED APPLICATIONS

This application claims priority to U.S. Provisional Patent Application No. 62/441,880, filed Jan. 3, 2017 ("AMBI-POLAR WIRING"); the aforementioned application being incorporated by reference in its entirety.

BACKGROUND

Lighting control systems used for lighting fixtures, including LED lighting fixtures, require installation and assembly based on correct matching of polarity when interconnecting wiring components. The requirement for matching polarities renders such interconnections otherwise non-interchangeable, and increases a likelihood of mismatches resulting in operational failures.

DETAILED DESCRIPTION

Figure 1:
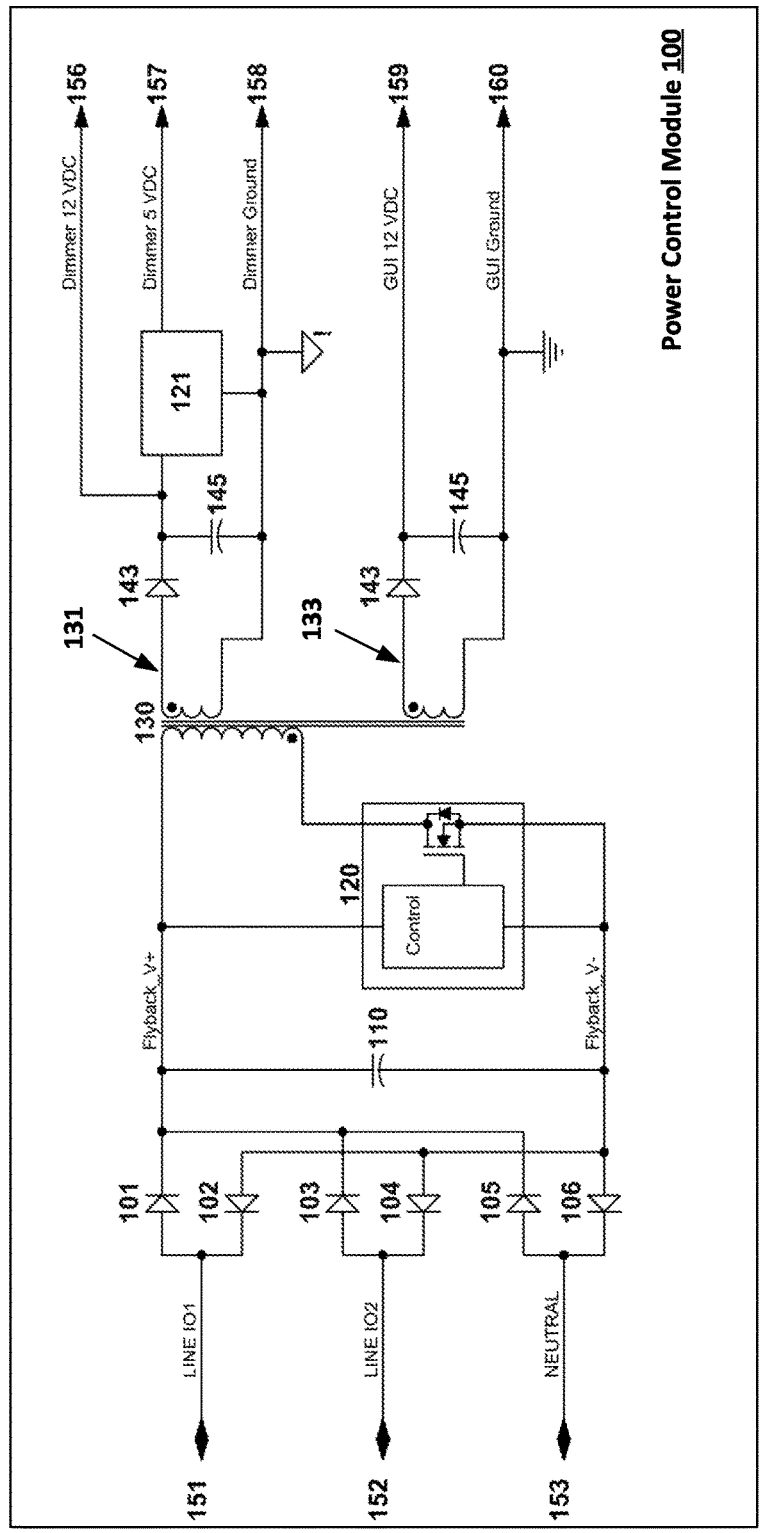
FIG. 1 illustrates an example of an ambi-polar power control module.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form in which an example of the invention may take, may be referred to as techniques. In general, the order of the steps of disclosed processes may be altered within the scope of the invention.

A detailed description of one or more embodiments of the invention is provided below. The invention is described in connection with such embodiments, but the invention is not limited to any embodiment. The scope of the invention is not limited by these embodiments and the invention encompasses numerous alternatives, modifications and equivalents. Numerous specific details are set forth in the following description in order to provide a thorough understanding of the invention. These details are provided for the purpose of example and the invention may be practiced without some or all of these specific details. For the purpose of clarity, technical material that is known in the technical fields related to the invention has not been described in detail so that the invention is not unnecessarily obscured.

Examples include a system to control a device that draws an electrical load, such as a lighting component or set of components. The system may include a set of connection lines, a power control module and a load interface component. The power control module is responsive to an alternating current source being connected to one of a first connection line or a second connection line, to provide a regulated voltage signal output. A load interface component receives the regulated voltage signal output to control the load device.

By way of example, the load device may correspond to a lighting component or device, and the load interface device may be implemented as a switch and/or a dimmer.

Still further, some examples include a reversible-polarity lighting control system having a first input to an input line coupled to a power supply module, a dimming control circuit coupled to the input line and electrically powered by the power supply module, a second input to a load line coupled to the dimming control circuit, and an AC lighting load coupled to the load line, wherein the first and second inputs are interchangeable to perform dimming of the AC lighting load.

Among other benefits, some examples described permit installation of lighting control systems, such as used for lighting fixtures, where interconnections (e.g., line and load wires) are interchangeable, irrespective of polarity. As such, examples as described permit installation in a manner that reduces occurrences of operational failures.

The variety of devices available for implementation of an ambi-polar controller system makes it impractical to describe all possibilities in a disclosure. An ambi-polar controller system may include any combination of current- and/or voltage-sensing within the scope of the disclosure. Optical isolation is shown as a means for bridging across safety isolation barriers, but other forms of isolation, such as magnetic, are possible also. Some groups of power diodes may be replaced with 2-diode arrays or 4-diode bridge rectifier. By way of example, a single-channel light dimming controller with voltage and current (power) measurement capability is provided. One of ordinary skill in the related arts will appreciate the generality of the disclosure and know how different implementations may be designed. All such are within the scope of this disclosure and claims.

FIG. 1 illustrates an example of an ambi-polar power control module for an electrical device, according to one or more examples. A power control module 100 may be responsive to an AC power supply (e.g., mains supply) provided through either one of two (or more) connection lines 151, 152. Accordingly, in FIG. 1, power is supplied through wires, represented by neutral line 153 and connection line 151 or 152. Power diodes 101 through 106 rectify the incoming alternating current (AC) provided on the main-connected line 151 or 152, in order to provide a rectified alternating current signal to a bulk bypass capacitor 110. In this manner, the power diodes 101-106 perform the function of an ordinary bridge rectifier, with two additional diodes to allow the line voltage to be supplied via either one of the connection lines 151 or 152.

A switching component, shown as offline switching controller IC 120, drives flyback transformer 130, whose outputs are provided on rails 131, 132. In some examples, a bias winding may be provided for the controller IC 120. A diode 143 and bypass capacitor 145 regulate the signal on each of the respective first and second rails 131, 133 (e.g., to 12V). The first rail 131 can include a first output line 156 carrying a first output signal generated by transformer 130. The first rail 131 may also include a second output line 157 carrying a second output signal that is post-regulated by regulator 121 (e.g., linear regulator). In an example, the first rail 131 carries 12V on the first output line 156 to power, for example, a dimmer, and 5V on the second output line 157 to power a dimmer controller. The second rail 133 can extend a third output signal 159 to power, for example, a graphic-user-interface front panel (not shown). Each of the first and second rails 131, 133 can include respective grounds 158, 160 for the respective output signals 156/157 and 159.

Figure 2:
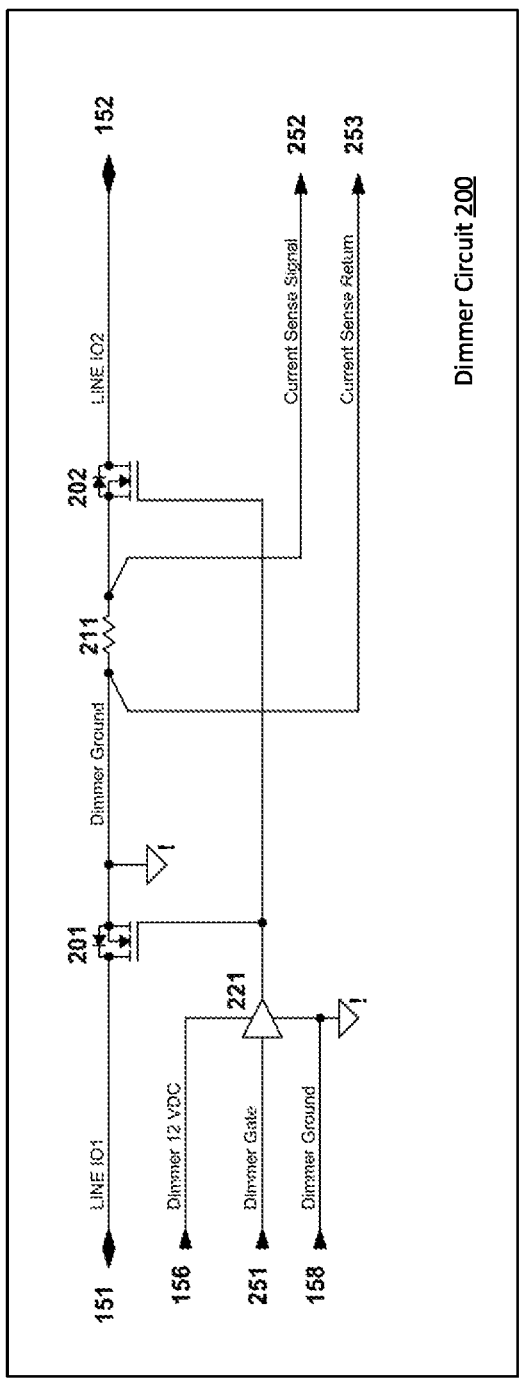
FIG. 2 illustrates an example of a dimmer circuit for use with an ambi-polar power control module, such as described with FIG. 1.

FIG. 2 illustrates an example of a dimmer circuit for use with an ambi-polar power control module, such as described with FIG. 1. In FIG. 2, a FET-based dimmer circuit 200 includes n-channel power FETs 201, 202. The FETs 201, 202 may include voltage, current, and on-resistance ratings that are matched to predetermined criteria. The source for the dimmer FETs 201, 202 can be tied to a small-value current-sense resistor 211 that is positioned on the source-current path provided by connection line 151 or 152. Either side of current-sense resistor 211 can be used as a ground reference for the dimmer control and power-measurement circuits, as described below. According to examples, either one of two "Line" wires represented by connection lines 151, 152 may be connected arbitrarily to the main, meaning the voltage across current-sense resistor 211 may be reversed relative to the line voltage, depending on which connection line 151, 152 is connected to the main. As described below with an example of FIG. 4, power-measurement firmware may be configured to compensate for a reverse connection of lines 151, 152 by, for example, detecting out-of-phase current and programmatically reversing the sign of the measurement.

With further reference to an example of FIG. 2, one end of current-sense resistor 211 may be grounded (e.g., as ground 158). Since the current polarity is arbitrary based on how the external wires (as represented by connection lines 151, 152) are connected, the choice of which end of current-sense resistor 211 to ground is also arbitrary. In an example FIG. 2, the ground 158 may be isolated from the output ground, since it is often tied to the AC neutral voltage. In an example, a drain of each FET 201, 202 is tied together and driven by a FET gate driver 221. The driver 221 level-shifts and current-boosts from low-current, low-voltage signal 251 to a high-current, 12V FET gate-drive signal. The two ends of resistor 211 are Kelvin-connected to an amplifier which will be discussed in FIG. 4. As shown, the signal lines 158 and 253 may be electrically tied together at resistor 211, but are routed separately to minimize ground-loop-induced voltage errors.

Figure 3:
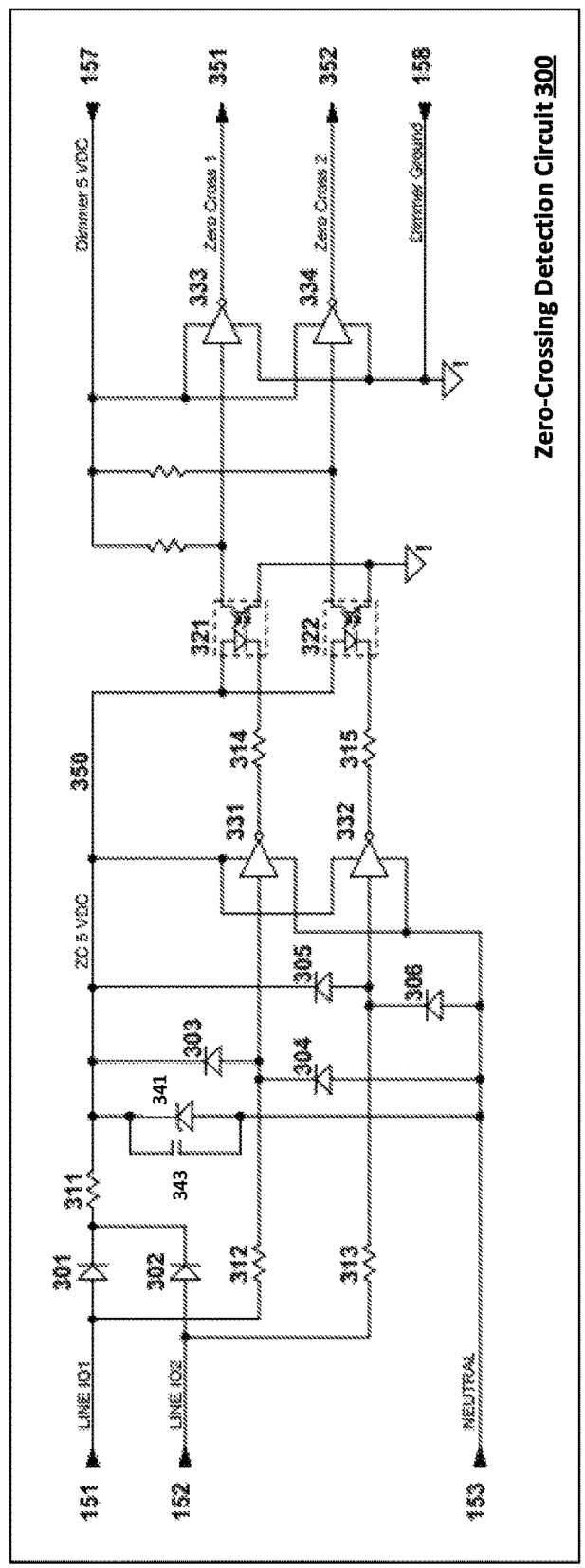
FIG. 3 illustrates an example of a dual-channel zero-crossing detection circuit.

FIG. 3 illustrates an example of a dual-channel zero-crossing detection circuit. As described, a dual-channel zero-crossing detection circuit 300 may be used to provide zero-crossing timing for dimming FETs 201/202. The zero-crossing timing enables the dimming FETs 201/202 to be turned ON and OFF at the correct times (e.g., at the correct phase angle) relative to the AC cycle of the main-connected line 151 or 152. This aspect of the circuit 300 enables support for devices with strict timing requirements, such as LED light fixtures. Since either of two wires (as represented by the connection lines 151 or 152) may be connected to the AC main (with the other going to the load), examples include separate zero-crossing detector circuits for each of the respective dimming FETs 201/202 and respective connection lines 151/152. Each of the zero-crossing detector circuits can generate a respective zero cross signal that enables the corresponding FET 201/202 to be switched on and off in phase relative to a cycle of the AC current of the main.

The connection lines 151 and 152 may be separately compared against neutral line 153 and converted to respective digital signals 351 and 352, which are referenced to ground signal 158. A low-current (~1 mA) power supply is needed to power the voltage comparators 331 and 332 and the LEDs in optocouplers 321 and 322. In an example, the supply is provided by diodes 301 and 302, shunt regulator 341, bulk storage capacitor 321 and resistor 311.

Capacitor 343 is bulk storage, and shunt regulator 341 regulates the supply voltage 350 (5V nominal). The shunt regulator 341 can be implemented as either an integrated circuit or a Zener diode. One of ordinary skill in the art will note other possible means of creating this low-current supply, such as by using capacitor current-feeding instead of a resistor, or with an additional winding on the flyback transformer 130 in FIG. 1.

In an example of FIG. 3, comparators 331 and 332 can be implemented using CMOS Schmitt-trigger inverters. In variations, other types of comparators, such as analog comparators, can be used. Resistors 312 and 313 (1-2 mega ohms) can be implemented to limit the input current to the comparators 331, 332 and diodes 303 through 306. Clamp diodes 303 through 306 can be used to regulate voltage and prevent voltage damage to the comparator inputs. The resistors 314 and 315 can be used to regulate the optocouplers' LED currents to a pre-determined threshold (e.g., 500 microamperes each). The optocouplers may be characterized by manufacturer specifications for low current applications (e.g., low LED current). The optocouplers' outputs are referenced to "ground" signal 158, as mentioned earlier. Schmitt-trigger inverters 333 and 334 may also buffer the optocouplers' output.

By utilizing redundant zero-crossing circuits, examples ensure that at least one zero-crossing circuit is connected to the AC line, even when the dimmer is off. At power-up, the microcontroller can examine both signals 351 and 352 and determine which one has proper timing when the dimmer is off. From that point forward, the microcontroller will ignore the other signal, since it is reporting the load-side zero-crossings, which are unreliable.

Figure 4:
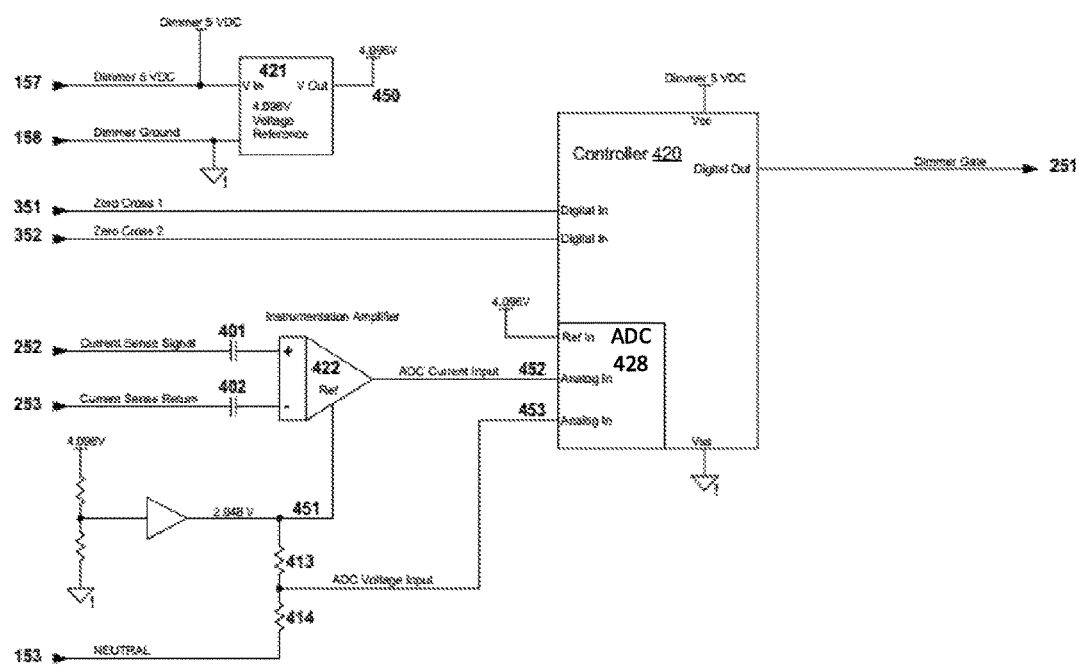
FIG. 4 illustrates an example of a microcontroller and analog front-end for a device that utilizes an ambi-polar power control module.

FIG. 4 illustrates an example of a microcontroller and analog front-end for a device that utilizes an ambi-polar power control module. A microcontroller 420 may provide, for example, intelligence and functionality for a device that is powered from the mains using either AC input line 151 or 152. The microcontroller 420 can be of any one of a variety of types (e.g., an ATmel ATmega168PB-AU). In some variations, the microcontroller 420 may include an internal analog-to-digital converter (ADC), to measure voltage and current. In variations, an external ADC may be used. Throughout this specification, the term "microcontroller" may be used to refer to a singular microcontroller or microprocessor (e.g. an ARM microprocessor, which in some embodiments may run an operating system such as Linux), or in some embodiments may refer to multiple microcontrollers and/or microprocessors working in tandem. For example, in one embodiment a microcontroller may capture touch information and transmit it to a microprocessor, which may perform gesture recognition and perform actions according to the recognized gesture, while in another embodiment a microcontroller may capture touch information and perform gesture recognition, and transmit the recognized gestures to a microprocessor which may perform actions according to the recognized gesture.

As shown by an example of FIG. 4, an IC component 421 provides a low-noise, tightly-regulated voltage reference signal 450 (e.g., 4.096V). In variations, other voltage reference signals can be used, including the microcontroller's power supply, as long as the selected voltage signal is well regulated and quiet.

Instrumentation amplifier 422 may boost low-voltage signals 252/253 from the current-sense resistor to drive a near-full-scale signal 452 to the ADC at maximum load levels. The amplification necessary may be design dependent, based on factors such as maximum load, the ADC range, and the load-sense resistor value. In an example, resistor 211 is 5 milliohms and the instrumentation amplifier gain is 16, making the signal at the ADC equal to 80 mV per amp.

Resistor divider 413/414 can be provided to attenuate the line voltage down to an ADC-readable range. The voltage may only be accurate when dimmer FETs 201/202 are ON. When dimmer FETs 201 and 202 are ON, the "ground" reference 158 may be tied to the main-connected line 151 or 152, and the reference voltage of signal line 451 may be 2.048V above the respective AC line (that is, the reference voltage 451 tracks the AC line voltage with a +2.048V offset). With one end of divider 413/414 tied to signal line 451 (AC line plus 2.048V when the dimmer is ON) and the other end to 153 (AC neutral), a signal on line 453 can have a peak-to-peak voltage swing that is consistently proportional to the AC line voltage peak-to-peak. In an example of FIG. 4, resistors 413/414 provide a divide ratio of 100, using respective values of 10 k/990 k Ohms. In such an example, the voltage provided to the ADC 428 of the microcontroller 420 can be based on the AC voltage divided by 100 and offset by 20.48 mV (2.048V divided by 100). The voltage supplied to the ADC 428 may only be readable when dimmer FETs 201/202 are ON, when there is an active load.

Figure 5:
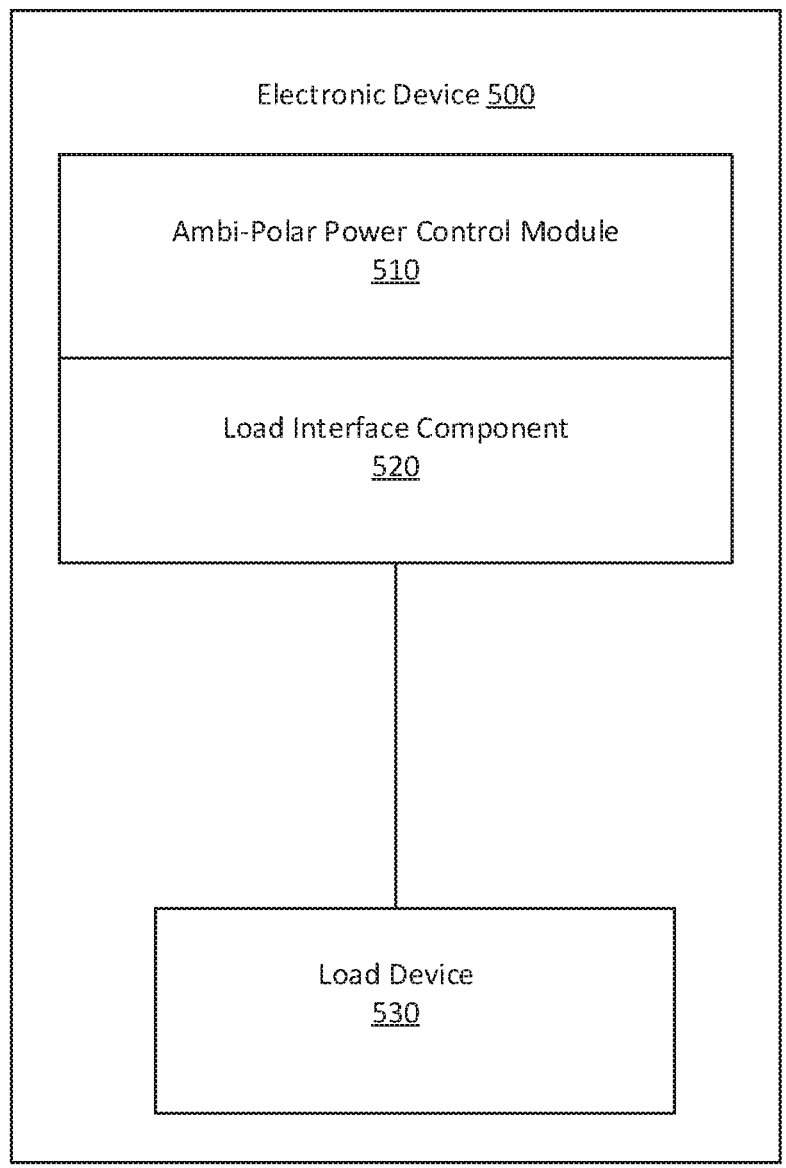
FIG. 5 illustrates an example of an electronic device for controlling a load device.

FIG. 5 illustrates an example of an electronic device for controlling a load device. As described, an electronic device 500 includes an ambi-polar power control module 510, load interface component 520 and load device 530. By way of example, a device 500 may correspond to a light switch device, the load interface component may correspond to a dimmer component, and the load device may correspond to a lighting component, set of lighting components, or lighting system. Accordingly, as a light switch device, device 500 may integrate and electrically connect to an electrical outlet of a dwelling, to operate as a switch to control lighting of the dwelling. In such examples, the light switch device and the lighting components may connect to a common circuit panel to receive power. As a light switch device, the device 500 may include a housing that conforms to a form factor that is suitable for use with outlets that support standard electrical switches.

In an example, the ambi-polar power control module 510 may be implemented using a power control module 100, such as described with an example of FIG. 1. The load interface component 520 may be implemented using a dimmer circuit 200, such as described with an example of FIG. 2. Likewise, the load interface component 520 may also utilize a zero-crossing detection circuit 300, such as shown by an example of FIG. 3. As an addition or variation, the device 500 may utilize a microcontroller to enable features such as a user-interface.

The power control module 510 may provide a regulated voltage signal output, which the load interface component 520 may utilize in controlling the load device 530. As described with other examples, the power control module 510 can receive input from an AC current line in either polarity. Among other benefits, the device 500 can facilitate installation, and reduce the propensity of installation error (e.g., reversing line and load during installation), which may particularly be harmful to a switch device with sensitive componentry.

Although the foregoing embodiments have been described in some detail for purposes of clarity of understanding, the invention is not limited to the details provided. There are many alternative ways of implementing the invention. The disclosed embodiments are illustrative and not restrictive.

What is being claimed is:

1. A system to control an electrical device, the system comprising:
    a set of connection lines, including a first connection line and a second connection line, either the first connection line or the second connection line being connectable to an alternating current source;
    a power control module that is responsive to the alternating current source being connected to one of the first connection line and the second connection line to provide a regulated voltage signal output; and
    a load interface component to receive the regulated voltage signal output, the load interface component being operable to control the electrical device.

2. The system of claim 1, wherein the first connection line and the second connection line, when connected, have a reverse polarity.

3. The system of claim 2, wherein the load interface component includes a dimmer circuit, and the electrical device is a light that is dimmable by the dimmer circuit.

4. The system of claim 3, wherein the load interface component provides zero-crossing timing with an output to control the light.

5. The system of claim 1, wherein the system is implemented as a light switch.

6. The system of claim 5, further comprising a microcontroller to provide a programmable user-interface for the light switch.

7. The system of claim 6, wherein the microcontroller drives the load interface component.

8. The system of claim 6, wherein the microcontroller performs circuit power measurements for the load interface component.

9. The system of claim 1, wherein the power control module rectifies the alternating current source provided to the one of the first or second connection lines.

10. The system of claim 9, wherein the power control module includes a flyback transformer to generate an output signal on one or more rails.

11. The system of claim 1, wherein the power control module includes:
    a diode bridge for each of the first connection line and the second connection line;
    a bulk capacitor;
    a switching component; and
    a flyback transformer;
    wherein the bulk capacitor and the switching component are connected to receive an output of the diode bridge of the first or second connection line, and the switching component drives the flyback transformer to provide the regulated voltage output.

12. The system of claim 1, wherein the load interface component includes a first field effect transistor (FET) and a second FET, a source of the first FET being connected to the first connection line, and a source of the second FET being connected to the second connection line, wherein a drain of each of the first and second FETs are tied together and driven by a gate driver.

13. The system of claim 12, wherein the gate driver of each of the first FET and the second FET is driven by a microcontroller that is also connected to a corresponding zero-crossing detector circuit, each of the corresponding zero-crossing detector circuits generating a respective zero cross signal that enables the microcontroller to switch the corresponding first or second FET on and off in phase relative to a cycle of the alternating current source.

14. A power control system for controlling power to an electrical device, the power control system comprising:
   a set of connection lines, including a first connection line and a second connection line, either the first connection line or the second connection line being connectable to an alternating current source; and
   a power control module that is responsive to the alternating current source being connected to one of the first connection line and the second connection line to provide a regulated voltage signal output for a load interface component of the electrical device.

15. The power control system of claim 14, wherein the first connection line and the second connection line, when connected, have a reverse polarity.

16. The power control system of claim 14, wherein the power control module rectifies the alternating current source provided to the one of the first or second connection lines.

17. The power control system of claim 16, wherein the power control module includes a flyback transformer to generate an output signal on one or more rails.

18. The power control system of claim 17, wherein the power control module includes:
   a diode bridge for each of the first connection line and the second connection line;
   a bulk capacitor;
   a switching component; and
   a flyback transformer;
   wherein the bulk capacitor and the switching component are connected to receive an output of the diode bridge of the first or second connection line, and the switching component drives the flyback transformer to provide the regulated voltage output.

19. The power control system of claim 17, wherein the load interface component includes a first field effect transistor (FET) and a second FET, a source of the first FET being connected to the first connection line, and a source of the second FET being connected to the second connection line, wherein a drain of each of the first and second FETs are tied together and driven by a gate driver.

20. The power control system of claim 19, wherein each gate driver of the first FET and the second FET is driven by a microcontroller that is also connected to a corresponding zero-crossing detector circuit, each of the corresponding zero-crossing detector circuits generating a respective zero cross signal that enables the microcontroller to switch the corresponding first or second FET on and off in phase relative to a cycle of the alternating current source.

\* \* \* \* \*